United States Patent Office 2,812,984
Patented Nov. 12, 1957

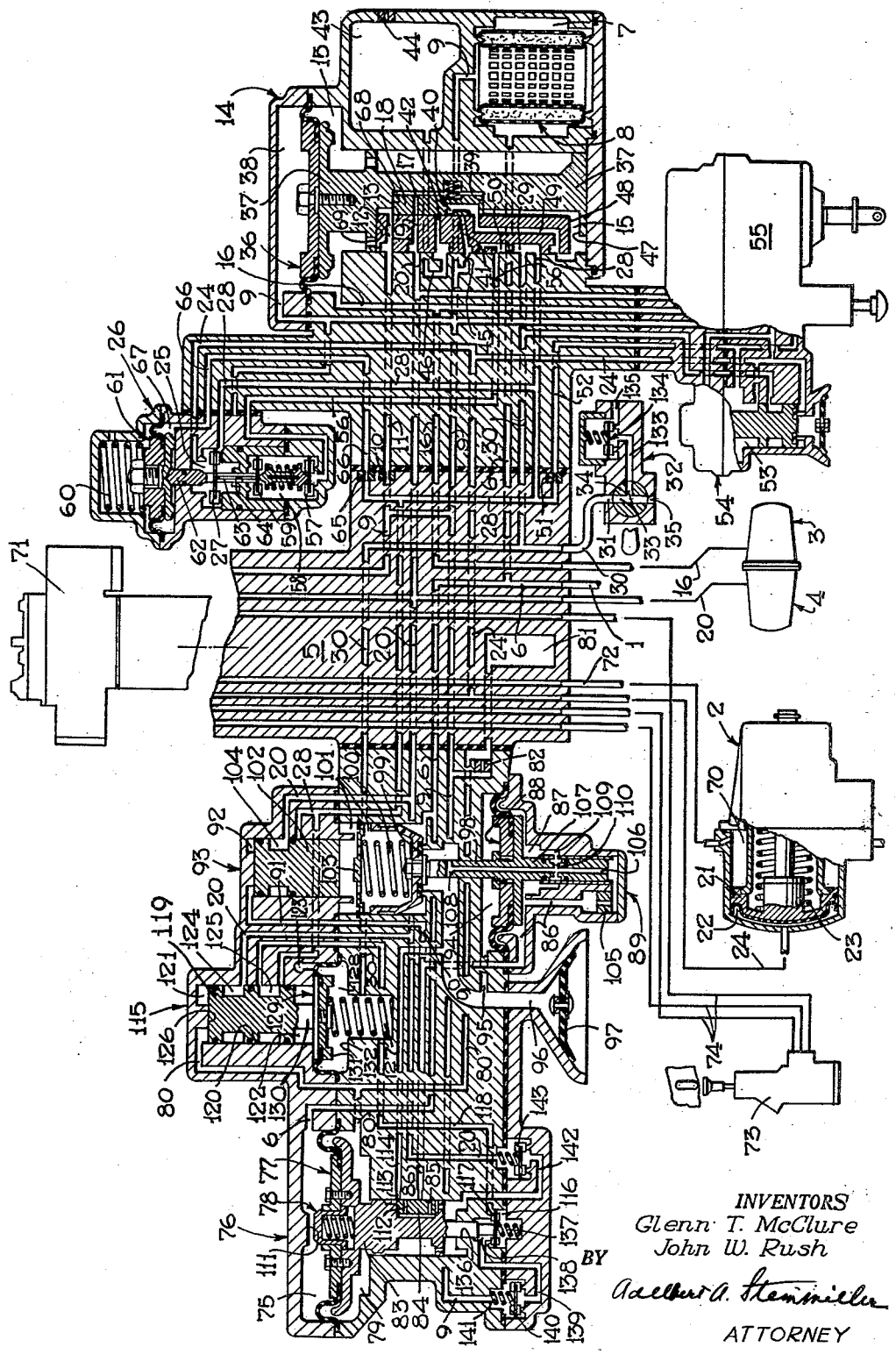

2,812,984
FLUID PRESSURE BRAKE APPARATUS

Glenn T. McClure, McKeesport, and John W. Rush, Pittsburgh, Pa., assignors to Westinghouse Air Brake Company, Wilmerding, Pa., a corporation of Pennsylvania Application March 23, 1955, Serial No. 496,250

6 Claims. (Cl. 303—35)

This invention relates to fluid pressure brake apparatus for railway cars, and more particularly, this invention relates to such apparatus for effecting a supply of fluid under pressure from an auxiliary reservoir or/and an emergency reservoir to the brake cylinder on a railway car, for service and emergency brake applications thereon, responsively to service and emergency reductions, respectively, in pressure of fluid in a brake pipe, and for effecting release of such fluid under pressure from the brake cylinder responsively to restoration of brake pipe pressure. An apparatus of the above general type may be such as the well-known Westinghouse AB equipment, for example, or apparatus such as is disclosed in the corresponding United States application of Glenn T. McClure, Serial No. 357,984, filed May 28, 1953, and assigned to the assignee of the present application.

A prime object of the invention is to provide an improved fluid pressure brake apparatus of the above type which incorporates means for accelerating release of fluid under pressure from the brake cylinder responsively to initiation in restoration of brake pipe pressure following service and emergency brake applications.

Another object of the invention is to provide a fluid pressure brake apparatus of the above type which incorporates means responsive to initiation of brake pipe pressure restoration following a service application of the brakes on a railway car employing such apparatus, for effecting local supply of fluid under pressure from the emergency reservoir into the brake pipe on such car to hasten the build-up in pressure of fluid therein and thereby accelerate release of such service application.

Another object of the invention is to provide a fluid pressure brake apparatus of the above type which includes a brake cylinder pressure retainer valve device which is positionable selectively to enable a complete release of fluid under pressure from brake cylinder, or to retain a certain brake cylinder pressure or pressures upon release of brakes during "cycling," and also includes means responsive to initiation of brake pipe pressure restoration following a service application of the brakes to effect supply of fluid under pressure from the emergency reservoir to the brake pipe for acceleration of the brake release, only when the retainer valve device is positioned for complete release of the brakes.

Another object of the invention is to provide a fluid pressure brake apparatus of the above type which includes means responsive to initiation of brake pipe pressure restoration on a railway car employing such apparatus, for effecting local supply of fluid under pressure to the brake pipe from the emergency reservoir following a service application of brakes on such car and from the brake cylinder and the auxiliary reservoir following an emergency application of such brakes, to hasten the build-up in pressure of fluid in the brake pipe and thereby accelerate release of the brakes following either type of brake application.

Another object of the invention is to provide a fluid pressure brake apparatus of the above type which includes a vent valve device for effecting local venting of fluid under pressure from the brake pipe from the car employing such apparatus, and an accelerated release selector valve device to determine whether emergency reservoir or brake cylinder and auxiliary reservoir will be connected to the brake pipe for accelerating the release of the brakes, and a valve device for controlling operation of the vent valve device and the accelerated release selector valve device according to the type of brake application effected.

Other objects and advantages of the invention will become apparent from the following more detailed description thereof when taken in connection with the accompanying drawing in which the single figure is a schematic representation of a fluid pressure brake apparatus embodying the invention.

Description

Referring to the drawing, the subject brake apparatus embodying the invention comprises a brake pipe 1, a brake cylinder device 2, an auxiliary reservoir 3, an emergency reservoir 4, and a brake controlling valve device 5 for controlling supply of fluid under pressure from the brake pipe 1 to the auxiliary and emergency reservoirs 3 and 4 for charging same, for controlling supply of fluid under pressure from these reservoirs to the brake cylinder device 2 responsively to reductions in pressure of fluid in the brake pipe 1, and for controlling release of such fluid under pressure from the brake cylinder device 2 responsively to subsequent restoration in pressure of fluid in said brake pipe.

Such apparatus on each car of a railway train is intended to be employed in conjunction with an engineer's brake valve device (not shown) on the locomotive of such train which is operable manually to a release position to connect the brake pipe 1 extending throughout the length of the train to a source of fluid under pressure on the locomotive at a pressure of such as seventy pounds per square inch; operable to a service position for connecting the brake pipe 1 at the locomotive to the atmosphere for release of fluid under pressure from said brake pipe at a service rate; operable to an emergency position for connecting the brake pipe 1 at the locomotive to the atmosphere for releasing fluid under pressure therefrom at an emergency rate which is faster than said service rate; and operable to a lap position for closing off said brake pipe at the locomotive from the source of fluid under pressure on the locomotive as well as from the atmosphere.

When the auxiliary and emergency reservoirs 3 and 4 in the fluid pressure brake apparatus on each car of the train are devoid of fluid under pressure, the engineer on the locomotive will move the brake valve thereon to such as its release position for effecting supply of fluid under pressure to the brake pipe 1 from the source of fluid at the chosen pressure of such as seventy pounds per square inch.

Such fluid under pressure as thus supplied to the brake pipe 1 will flow to a brake pipe passageway 6 in the brake controlling valve device 5 on each car of the train, and such fluid under pressure thence will flow to the auxiliary reservoir 3 by way of a charging communication which includes said brake pipe passageway 6, a chamber 7 and curled hair strainer 8 therein, a brake pipe passageway 9 and branches thereof, a charging choke 10, a brake pipe passageway 11, a port 12 in a slide valve 13 in a service or triple valve portion 14 of the brake controlling valve device 5, a slide valve chamber 15 in said portion 14, and an auxiliary reservoir passageway and pipe 16 which is constantly open to said slide valve chamber 15 and to the auxiliary reservoir 3.

At the same time, fluid under pressure thus supplied from the brake pipe 1 to the slide valve chamber 15 via the above-traced charging communication, will also flow to the emergency reservoir 4 by way of a port 17 in an auxiliary slide valve 18 in the service or triple valve portion 14, a registering port 19 in the slide valve 13 of said triple valve portion, and an emergency reservoir pipe and passage 20 which is in constantly open communication with said emergency reservoir 4.

The auxiliary and emergency reservoirs 3 and 4 in the brake apparatus on each car on the train will thus be charged from the brake pipe 1 by way of the above-traced charging communications in the respective brake controlling valve devices 5 on such cars to a normal brake pipe pressure value of such as seventy pounds per square inch, thereby rendering such brake apparatus capable of effecting supply of fluid under pressure to the respective brake cylinder devices 2 for applying brakes on such cars.

The brake cylinder device 2 on each car of the train comprises the usual piston 21 adapted for operative connection with the usual brake rigging (not shown) through the medium of the usual push rod (not shown), and such piston is subject opposingly to pressure of fluid in the usual brake cylinder pressure chamber 22 and to force of a return spring 23. During the initial charging of the auxiliary and emergency reservoirs 3 and 4 as described above, and subsequently so long as the pressure of fluid in the brake pipe 1 remains at its normal full charge value of such as seventy pounds, the brake cylinder pressure chamber 22 will be vented to the atmosphere by way of an unrestricted exhaust communication which includes a brake cylinder pipe and passageway 24, a chamber 25 in an inshot and quick service limiting portion 26 of the brake controlling valve device 5, an unseated check valve 27 also in said inshot and quick service limiting portion, a passageway 28, a cavity 29 in the slide valve 13 of the service or triple valve portion 14 in its release position at this time, a passageway and pipe 30, an inlet port 31 in a retainer valve device 32, a port 33 in an angle cock 34 of said device when positioned as shown in the drawing for full release of the brakes, and an exhaust port 35 also in device 32. With brake cylinder pressure chamber 22 thus vented to the atmosphere and when therefore devoid of fluid under pressure, the return spring 23 will maintain the brake cylinder piston 21 in its release position in which it is shown in the drawing, for release of the brakes on the respective car.

*Service application of the brakes*

For sake of illustration, the service or triple valve portion 14 of each brake controlling valve device 5 comprises a diaphragm-piston 36 which is operatively connected to a slide valve stem 37 for actuating slide valves 13 and 18. The diaphragm piston 36 is subject opposingly to pressure of fluid in a brake pipe pressure chamber 38 at one side and to auxiliary reservoir pressure in the slide valve chamber 15 at its opposite side; said brake pipe pressure chamber 38 being in constantly open communication with the brake pipe 1 by way of a branch of the brake pipe passageway 9, strainer chamber 7, and brake pipe passageway 6.

When pressure of fluid in the brake pipe 1 is reduced at a service rate by virtue of manipulation of the brake valve on the locomotive to service position, such reduction in brake pipe pressure as experienced in chamber 38 in the service or triple valve portion 14 of each brake controlling valve device 5 on the respective cars of the train will cause the resultant preponderant auxiliary reservoir pressure in slide valve chamber 15 backed up by charging choke 10 to actuate, through the medium of a shoulder 39 on stem 37, the auxiliary slide valve 18 upwardly, as viewed in the drawing, relative to the slide valve 13 to a quick service position in which the auxiliary reservoir charging port 12 and emergency reservoir charging port 19 in the slide valve 13 are blanked off by said auxiliary slide valve and a quick service cavity 40 is brought into registry with ports 41 and 42 in the slide valve 13 for connecting the brake pipe 1 to a quick service volume 43 vented to the atmosphere by a leak choke 44, by way of the brake pipe passageway 6, strainer chamber 7, brake pipe passageway 9, a choke 45, said port 41, said quick service cavity 40, said port 42, and a passageway 46. In the well-known manner, such connection of the brake pipe 1 to the quick service volume 43 permits a quantity of fluid under pressure to rapidly flow locally from the brake pipe to fill such volume and thereby effect a rapid local reduction in brake pipe pressure which is propagated serially back through the train by corresponding quick service reductions in brake pipe pressure as effected by the respective brake controlling valve devices 5 on the various succeeding cars thereof.

The initial quick service position of the auxiliary slide valve 18 relative to the main slide valve 13 is defined by engagement of a shoulder 47 formed in a slide valve stem 37 with a shoulder 48 formed in the lowermost end of said slide valve 13 as viewed in the drawing. In such preliminary quick service position of the auxiliary slide valve 18, one end of a brake cylinder service supply port 49 in the main slide valve 13 is uncovered to the slide valve chamber 15 in the triple valve portion and thereby to the auxiliary reservoir. After the sudden, local, quick service reduction in brake pipe pressure has been effected by the flow of fluid under pressure to the quick service volume 43, quick service reduction in brake pipe pressure continues at a slower rate by flow through the choke 44 for the purpose of insuring obtaining a sufficient reduction in brake pipe pressure below auxiliary reservoir pressure acting on opposite sides of the diaphragm piston 36 to cause said diaphragm piston to move the main slide valve 13 through the medium of the stem 37 and shoulders 47 and 48 to a service position in which: the opposite end of the service supply port 49 is connected to the brake cylinder passageway 28 for supply of fluid under pressure to the brake cylinder device 2, as will be traced subsequently; the port 41 in the main slide valve 13 is moved out of registry with the brake pipe passageway 9 via choke 45 to terminate the preliminary quick service venting of fluid under pressure from the brake pipe to the quick service volume 43 and choke 44; and, a secondary quick service cavity 50 is brought into registry with said brake pipe passageway 9 via choke 45 for continued quick service withdrawal of fluid under pressure from the brake pipe 1 to the brake cylinder device, as will be traced subsequently.

Immediately upon registry of the service supply port 49 in the main slide valve 13 with brake cylinder passageway 28 with movement of said slide valve to its service position, fluid under pressure from the auxiliary reservoir 3 will flow to brake cylinder pressure chamber 22 in brake cylinder device 2 preponderantly by way of pipe and passageway 16, the slide valve chamber 15 and said brake cylinder supply port 49 in the service or triple valve portion 14, the brake cylinder passageway 28, the unseated check valve 27 in the inshot and quick service limiting portion 26 of the brake controlling valve device 5, the chamber 25 also in said portion 26, and the pipe and passageway 24 to the brake cylinder device. Such flow of fluid under pressure to the brake cylinder pressure chamber 22 from the auxiliary reservoir 3 to the brake cylinder device 2 via the communication traced above will occur at a relatively rapid rate since such flow path is substantially without restriction. At the same time, some auxiliary reservoir fluid supplied to the brake cylinder passageway 28 as traced above will also flow to the brake cylinder pressure chamber 22 at a restricted rate from said passageway 28 via the usual inshot baffle choke 51, a brake cylinder passageway 52, a chamber 53 in a brake cylinder vent valve portion 54 in a brake cylinder release and reapplication valve device 55, and a branch of the brake cylinder passageway and pipe 24; the brake cylinder release and reapplication valve device 55 forming no part of the present invention except insofar as baffle-choke-supply to the brake cylinder device occurs via the brake cylinder vent valve portion 54 thereof.

In the usual manner, upon establishing registry of the secondary quick service cavity 50 with brake pipe passageway choke 45 by movement of the main slide valve 13 to its service position as previously described, flow of fluid under pressure from the brake pipe 1 will continue to be withdrawn locally to the brake cylinder device 2 by way of brake pipe passageway 6; connected brake pipe 1; the strainer chamber 7; the brake pipe passageway 9; the quick service limiting choke 45; said cavity 50; a secondary quick service passageway 56; a spring-biased check valve 57 and a chamber 58 in the inshot and quick service limiting portion 26 of the brake controlling valve device 5; a spring-biased check valve 59 held unseated by a control spring 60 in said portion 26 through the medium of a diaphragm piston 61 and abutting stem assemblage 62, 63; a port 64; the chamber 25; and the brake cylinder passageway and pipe 24. It will be noted here that the check valve 57 in the inshot and quick service limiting portion 26 of the brake controlling valve device 5 operates to prevent backflow of fluid under pressure from the brake cylinder device 2 to the brake pipe 1 should the pressure of fluid in the brake pipe 1 be reduced to atmospheric pressure or to pressures lower than those existent or that existent in the brake cylinder, such for example, as when said brake pipe is completely vented to the atmosphere to effect an emergency application of the brakes, which will hereinafter be described.

As fluid under pressure is supplied from the service or triple valve portion 14, as above-described, to the brake cylinder device 2 via the brake cylinder passageway 28, a portion of such fluid under pressure will also flow from said passageway 28 by way of a stabilizing choke 65 and a brake cylinder passageway 66 to a brake cylinder pressure chamber 67 at one side of the diaphragm piston 61 in the inshot and quick service limiting portion 26, to oppose action of the control spring 60 on said diaphragm piston. When a certain brake cylinder pressure, such as ten pounds per square inch, is realized in the brake cylinder pressure chamber 67 in the inshot and quick service limiting portion 26 as a result of supply of fluid under pressure from the auxiliary reservoir 3 to the brake cylinder device 2 via the service or triple valve portion 14 as above described, such pressure in the brake cylinder pressure chamber 67 will effect movement of the diaphragm piston 61 to permit the spring-biased check valves 27 and 59 to seat and thereby terminate subsequent and unrestricted supply of fluid under pressure to the brake cylinder device 2 and terminate secondary flow of quick service withdrawal of fluid under pressure from the brake pipe 1 to the brake cylinder device 2 via the chamber 25 in said inshot and quick service limiting portion 26.

After the check valves 27 and 59 in the inshot and quick service limiting portion 26 of the brake controlling valve device 5 close as above to prevent further unrestricted supply of fluid under pressure to the brake cylinder device 2 and to prevent further local quick service withdrawal of fluid under pressure from the brake pipe 1, pressure of fluid in brake pipe 1 will continue to reduce by way of the engineer's brake valve device on the locomotive while in its service position until the desired degree of service reduction has been attained, after which the engineer will move the brake valve to its lap position to retain the desired degree of brake pipe pressure as attained by manipulation of the brake valve. Meanwhile, the service or triple valve portion 14 in the brake controlling valve devices 5 on each car of the train will remain in service position to continue supply of fluid under pressure to the brake cylinder pressure chamber 22 in the brake cylinder device 2 at a controlled rate by way of the service supply port 49 in the main slide valve 13 of said portion 14, the brake cylinder passageway 28, the inshot baffle choke 51, the passageway 52, etc., as previously traced.

As a result of such supply of fluid under pressure from the auxiliary reservoir 3 to the brake cylinder device 2 by way of the service or triple valve portion 14, the pressure of fluid in the auxiliary reservoir will reduce, and such reduction will be experienced in the slide valve chamber 15 of said portion 14. When the auxiliary reservoir pressure in the slide valve chamber 15 in triple valve portion 14 reduces slightly below brake pipe pressure existent in the chamber 38, the diaphragm piston 36 in said portion 14 will move in the direction of said chamber 15 and, through the medium of the slide valve stem 37 and a shoulder 68 therein in abutment with the auxiliary slide valve 18, will effect movement of said auxiliary slide valve relative to the main slide valve 13 to a lap position defined by engagement of a shoulder 69 in said stem 37 with the upper end of the main slide valve 13 as viewed in the drawing. The engagement of shoulder 69 in the slide valve stem 37 with the upper end of the main slide valve 13 at this time prevents further downward movement of the triple valve assemblage and defines what is commonly known as a service lap position in which the auxiliary slide valve 18 laps the service port 49 to thereby prevent further flow of fluid under pressure from the auxiliary reservoir 3 to the brake cylinder pressure chamber 22 in the brake cylinder device 2 and thereby limit the pressure of fluid attained therein in accordance with the service reduction in brake pipe pressure.

As a result of such supply of fluid under pressure to the brake cylinder pressure chamber 22 in the brake cylinder device 2 as described above, the piston 21 therein will be moved against opposition of the return spring 23 to actuate the push rod (not shown) to take up the slack in brake rigging (not shown) and advance the brake shoes (not shown) into engagement with the wheels of the railway car and to effect an application of the brakes on such wheels according to the degree of pressure in said chamber 22 and hence in accord with the degree of service reduction in pressure of fluid in the brake pipe 1.

If a further service reduction in pressure of fluid in the brake pipe 1 is effected for increasing the degree of service application of the brakes, in the brake controlling valve device 5 on each car of the train, the diaphragm piston 36 will move in the direction of chamber 38 responsively to such further reduction of brake pipe pressure therein to actuate the auxiliary slide valve 18 out of its lap position to reestablish communication between the main slide valve's service port 49 and the slide valve chamber 15 for supply of fluid under pressure from the auxiliary reservoir 3 to the brake cylinder device 2 to increase the pressure of fluid therein to a value commensurate with the further reduction in brake pipe pressure, as will be apparent from the foregoing description. Subsequently, the resultant reduction in auxiliary reservoir pressure as experienced in the slide valve chamber 15 in the service or triple valve portion 14 of the brake controlling valve device 5 will cause the diaphragm piston 36 to return the auxiliary slide valve 18 to its lap position for holding the desired brake cylinder pressure.

From the foregoing it will be apparent that on each car of the train the auxiliary and emergency reservoirs 3 and 4 will be charged with fluid under pressure from brake pipe 1 by way of a charging communication or communications under the control of the service or triple valve portion 14 of the respective brake controlling valve device 5, and that the degree of brake cylinder pressure in chamber 22 in the corresponding brake cylinder device 2, hence the degree of service application of the brakes, as effected by supply of fluid under pressure thereto from the auxiliary reservoir 3, is controlled by the service or triple valve portion 14 and the inshot and quick service limiting portion 26 of such brake controlling valve device according to the degree of reduction in brake pipe pressure.

As shown in the drawing, the brake cylinder device 2 is of a load compensating type which comprises a load compensating pressure chamber 70 adapted to be supplied with fluid under pressure by way of a load compensating portion 71 (shown in outline) of the brake controlling valve device 5 by way of a pipe and passageway 72 to partially neutralize the brake applying effect of fluid pressure in the chamber 22 on the piston 21 according to the load carried on the vehicle. Also shown in the drawing in outline is a known form of strut cylinder device 73 which is operatively connected to the load compensating portion 71 of valve device 5 by way of such as pipe and passages 74 to condition said portion 71 according to the degree of the load carried by the car. Since the load compensating portions of the equipment form no portion of the novel aspects of applicants' invention, further description of such portions is omitted herein.

*Emergency application of the brakes*

In effecting an emergency application of the brakes, the engineer's brake valve device on the locomotive will be moved to emergency position to connect the brake pipe on the locomotive locally to the atmosphere for complete release of fluid under pressure and at a faster rate than transpires when said brake valve device is in service position. A resultant reduction in pressure of fluid will be experienced in the brake pipe 1 on the first car of the train, and this reduction in brake pipe pressure will be experienced in the brake pipe pressure chamber 38 in the service or triple valve portion 14 of brake controlling valve device 5 on such car and will cause same to consecutively assume its quick service and service positions for effecting local withdrawal of fluid under pressure from the brake pipe and supply of fluid under pressure from the auxiliary reservoir 3 to the brake cylinder pressure chamber 22 in the brake cylinder device 2 as set forth previously herein. At the same time, such reduction in pressure of fluid in the brake pipe 1 will be experienced also by way of the brake pipe passageway 6, in a brake pipe pressure chamber 75 in an emergency application control portion 76 of the brake controlling valve device 5. As a result of such emergency reduction in brake pipe pressure as experienced in the brake pipe pressure chamber 75 in the emergency application control portion 76, a diaphragm piston 77 in said portion 76 will be moved in the direction of said chamber 75 against opposition of a cage and return spring assemblage 78 by preponderant pressure of fluid in a chamber 79 which is constantly open by way of a passageway 80 to a quick action chamber 81 normally charged from the brake pipe 1 by way of a quick action chamber charging choke 82, the brake pipe passageway 9, the strainer chamber 7, and the brake pipe passageway 6. Such movement of the diaphragm piston 77, through the medium of a slide valve stem 83, effects movement of a slide valve 84 to a position for registration of a port 85 therein, constantly open to chamber 79, with a passageway 86 to permit fluid under pressure to flow from said chamber 79 and the quick action chamber 81 open thereto to a control chamber 87 at one side of a diaphragm piston 88 in an emergency vent valve portion 89, and via a choke 90 and a passageway 91 to a control chamber 92 in a high pressure valve portion 93.

The opposite side of the diaphragm piston 88 in the emergency vent valve portion 89 is exposed to a nonpressure chamber 94 which is constantly open to the atmosphere by way of an exhaust passageways 95, and a large capacity vent passageway 96 open to the atmosphere via a resilient dust excluded 97 associated therewith, so that the supply of fluid at normal brake pipe or quick action chamber pressure to the chamber 87 in the emergency vent valve portion 89 will cause movement of the diaphragm piston 88 in the direction of the chamber 94 to unseat, through the medium of a stem 98, a vent valve 99 against opposition of a compression spring 100 disposed in a brake pipe pressure chamber 101. Immediately upon unseating of the vent valve 99, a sudden, large capacity emergency venting flow of fluid under pressure from the brake pipe 1 to the atmosphere will occur by way of the brake pipe passageway 6, the brake pipe pressure chamber 101 and the unseated valve 99 in the emergency vent valve portion 89, the vent passageway 96 and the dust excluder 97. As a result of such local withdrawal of fluid under pressure from the brake pipe 1 by way of the emergency vent valve portion 89 of the brake controlling valve device 5 on the respective car, an emergency reduction in brake pipe pressure is transmitted to the brake controlling valve device 5 on the following car in the train and, by virtue of corresponding operation of the emergency vent valve portion 89 of the brake controlling valve device thereon, such reduction will be transmitted at a rapid rate serially from car to car throughout the length of the train, in the usual manner.

At the same time, the fluid at quick action chamber pressure in the control chamber 92 in the high pressure valve portion 93 is supplied thereto by the emergency application control portion 76 as described above, will cause movement of a piston valve 102 in said portion 93 against opposition of the rapidly reducing brake pipe pressure in chamber 101 to a position in the direction of said chamber 101 defined by engagement of the lowermost end of said piston valve with a fixed stop 103 to establish registry of a groove 104 in said piston valve with branches of the emergency reservoir passageway 20 and brake cylinder passageway 28. Upon the piston valve 102 thus being caused to assume its emergency supply position, fluid under pressure from the emergency reservoir 4 will flow to the brake cylinder pressure chamber 22 in the brake cylinder device 2 for added pressurization thereof above that realized by virtue of triple-valve-admitted auxiliary reservoir fluid, by way of said pipe and passageway 20, the groove 104 in said piston valve 102, the previously-mentioned branch of the brake cylinder passageway 28, the inshot baffle choke 51, the brake cylinder passageway 52, the chamber 53 in the brake cylinder vent valve portion 54 of the brake cylinder release and reapplication valve device 55, and the brake cylinder passageway and pipe 24. Perhaps momentarily such supply of fluid under pressure from the emergency reservoir 4 to the brake cylinder pressure chamber 22 in the brake cylinder device 2 by way of the brake cylinder passageway 28 will flow in by-pass of inshot baffle choke 51 by way of respective branch of said passageway 28, the check valve 27 in the inshot and quick service limiting portion 26, when unseated, the chamber 25 therein, the brake pipe passageway and pipe 24. Since, however, pressure of fluid in the brake cylinder pressure chamber 22 in the brake cylinder device 2 will be built up at a relatively rapid rate by virtue of flow of fluid under pressure thereto from both the auxiliary reservoir 3 and the emergency reservoir 4, and by virtue of the relatively rapid rate of reduction in brake pipe pressure experienced in the brake controlling valve device 5 as a result of operation of the emergency vent valve portion 89 as above described, the brake cylinder pressure as realized in chamber 67 in the inshot and quick service limiting portion 26 via passageway 66, choke 65, passageway 28 etc., will cause rapid closure of check valve 27 during the early stages of effecting an emergency application of the brakes, and subsequent brake cylinder supply will transpire exclusively by way of the inshot baffle choke 51.

From the foregoing it will be apparent that during the effecting of an emergency application of the brakes, in the usual manner, the pressure of fluid in the brake pipe will be reduced to that of the atmosphere while pressure of fluid in the auxiliary reservoir 3, emergency reservoir 4, and brake cylinder pressure chamber 22 equalize at some such pressure as sixty pounds per square inch. In each brake controlling valve device 5, the preponderant effect of of auxiliary reservoir pressure at such as sixty pounds per square inch in the slide valve chamber 15 in the service or triple valve portion 14 at one side of diaphragm piston 36 over atmospheric pressure in the brake pipe pressure chamber 38 at the opposite side of said diaphragm piston 36 will maintain the main slide valve 13 and auxiliary slide valve 18 in their service positions connecting the brake cylinder pressure chamber 22 in the brake cylinder device 2 to the auxiliary reservoir 3 by way of the brake cylinder passageway 28, the service port 49 of said slide valve 13, the slide valve chamber 15 of said triple valve portion 14, and the auxiliary reservoir passageway and pipe 16, as will be appreciated from previous description of operation of such service valve portion.

At the same time, subsequent to reduction in pressure of fluid in the brake pipe 1 to that of the atmosphere, via port 85 in slide valve 84 of the emergency application control portion 76, fluid under pressure from the quick action chamber 81 and connected chamber 79 in said emergency application control portion 76, as well as chamber 87 in the emergency vent valve portion 89, and, via passageway 91 and choke 90, the chamber 92, in the high pressure valve portion 93 will dissipate to the atmosphere by way of the passageway 86, a dissipation timing choke 105, a central passageway 106 in a stem type slide valve 107 attached to diaphragm piston 88, and a port 108 opening from an extension of said passageway 106 in the stem 98 which opens into the large capacity vent passageway 96.

Dissipation of fluid under pressure from chamber 87 in the emergency vent valve portion 89 by way of the timing choke 105 as set forth above, will permit the compression spring 100 to reseat the vent valve 99 to close off the brake pipe passage 6 to the atmosphere via passageway 96 and thereby permit subsequent pressurization of the brake pipe for release of the brakes as will be described in detail hereinafter. Through the medium of the stem 98, such closure of the vent valve 99 also causes actuation of the stem type slide valve 107 to the position in which it is shown in the drawing for connecting the chamber 87 to atmosphere additionally by way of a casing port 109 and a registering port 110 open to the central passageway 106 in said slide valve 107, said passageway 106, the port 108, and the large capacity vent passageway 96. By virtue of the additional venting communication of the chamber 87 to the atmosphere by way of ports 109 and 110 as well as by way of passageway 86, timing choke 105, passageway 106, etc., ample flow capacity is provided for dissipation of any fluid under pressure from the chamber 79 in the emergency application control portion 76 which may leak into chamber 87 via passageway 86 past the slide valve 84 when in its lap position in which it is shown in the drawing and which position it is caused to assume as will be described subsequently. Thus it will be apparent that leakage of fluid under pressure to the chamber 87 will be incapable of effecting unintended movement of the emergency valve portion 89 to its vent position.

As fluid under pressure is vented from the chamber 79 in the emergency application control portion 76 by way of the port 85 in the slide valve 84 thereof, the passageway 86, the timing choke 105, and the passageway 106 in the slide valve 107 and stem 98 in the emergency vent valve portion 89 as described above, such venting will sufficiently reduce the pressure of fluid in said chamber 79 to permit the cage and return spring assemblage 78, by virtue of its engagement with a casing shoulder 111, to move the slide valve 84 to a service position in which the port 85 open to chamber 79 is blanked off from the passageway 86 and a vent port 112 also open to said chamber 79 is brought into registry with a choke 113 constantly open to an exhaust passageway 114 connected to the large capacity vent passageway 96, whereupon, fluid under pressure from the chamber 79 and connected quick action chamber 81 will continue to reduce to the atmosphere by way of said port 112, choke 113, passageway 114, and vent passageway 96. The slide valve 84 in the emergency application control portion 76 will remain in such position with its vent port 112 in registry with the choke 113 and the cage and return spring assemblage 78 in abutment with casing shoulder 111 subsequent to reduction of pressure of fluid in the chamber 79 to that of the atmosphere, so long as brake pipe pressure in chamber 75 remains at atmosphere pressure.

In the emergency application control portion 76, during the effecting of a service application of the brakes by the service or triple valve portion 14 as previously described, the pressure of fluid in the chamber 79 and connected quick action chamber 81, charged from the brake pipe by way of the choke 82, will preponderate over the brake pipe pressure in chamber 75 while reducing at its service rate. Such rate of reduction in brake pipe pressure in chamber 75 will occur at a faster rate than any reduction in quick action chamber pressure which may be experienced as a result of flow of fluid under pressure from chamber 79 and quick action chamber 81 by way of the supply choke 82, with the result that pressure of fluid in the chamber 79 moves the diaphragm piston 77 in the direction of the brake pipe pressure chamber 75 to cause the cage and return spring assemblage 78 to abut the casing shoulder 111 and, through the medium of the slide valve stem 83, moves the slide valve 84 to its position for establishing registry of its port 112 with vent choke 113 for venting of said chamber 79, hence the quick action chamber 81, to the atmosphere by way of said choke 113 and the exhaust passage 114. With such release of quick action chamber fluid from chamber 79 via choke 113 and passageway 114 to the atmosphere, the reduction in quick action chamber pressure in chamber 79 will render such pressure acting on diaphragm piston 77 incapable of overcoming opposition of the cage and return spring assemblage 78 and of the service-rate-reducing brake pipe pressure in chamber 75 acting on the diaphragm piston 77, so that, during service reductions in brake pipe pressure, said diaphragm piston is prevented from moving the slide valve 84 to its emergency position to connect port 85 to passageway 86 for effecting operation of the vent and high pressure valve portions 89 and 93 as previously described. Thus it will be appreciated that during the effecting of a service application of the brakes by service reductions in brake pipe pressure, by virtue of the venting action of fluid under pressure from the chamber 79 via the port 112 in the slide valve 84 of the emergency application control portion 76, the chamber 92 in high pressure valve portion 93 will remain devoid of fluid under pressure while the piston valve 102 in said portion 93 remains in its uppermost position in which it is shown in the drawing to prevent supply of fluid under pressure from the emergency reservoir to the brake cylinder, and the vent valve 99 in the emergency vent valve portion 89 remains closed in absence of pressurization of chamber 87.

*Triple valve operation during release of the brakes following service and emergency brake applications*

Following a service application of the brakes, the diaphragm piston 36 in the service or triple valve portion 14 will respond to establishment of preponderance in brake pipe pressure in its chamber 38 over auxiliary reservoir pressure in its chamber 15, and, in the well-known manner, through the medium of shoulders 69 and 68 in the slide valve stem 37 attached to said diaphragm piston, will move the main slide valve 13 and auxiliary slide valve 18 to their release positions in which they are shown in the drawing, defined by engagement of the lowermost end of said stem with the casing, to again establish registry of the brake cylinder passageway 28 with the exhaust passageway 30 for release of fluid under pressure from the brake cylinder pressure chamber 22 in brake cylinder device 2 by way of the pipe and passageway 24, chamber 53 in the brake cylinder vent portion 54 of the brake cylinder release and reapplication valve device 55, the brake cylinder passage 52, the inshot baffle choke 51, brake cylinder passageway 28, the groove 29 in the slide valve 13 of said service or triple valve portion, said exhaust passageway 30, thence to the atmosphere by way of the brake cylinder retainer device 32. Such release of the brakes will occur at a rate controlled by the inshot baffle choke 51 until brake cylinder pressure as realized in the control chamber 67 in the inshot and quick service limiting portion 26 via passageway 66, stabilizing choke 65 and a branch of the brake cylinder passageway 28, reduces below the chosen value of such as ten pounds per square inch, whereupon, the spring 60 in said portion 26 will effect movement of the diaphragm piston 61 and stem assemblage 62, 63 to open the check valve 27 for permitting subsequent relatively unrestricted release of fluid under pressure from the brake cylinder pressure chamber 22 in by-pass of the inshot baffle choke 51 by way of said brake cylinder passageway 24, the chamber 25 in said portion 26, the unseated check valve 27, the brake cylinder passageway 28, the groove 29 in the slide valve 13 of the service or triple valve portion 14, the exhaust passageway and pipe 30, and the brake cylinder retainer device 32. At the same time that check valve 27 in the inshot and quick service limiting portion 26 is unseated as above described, the check valve 59 will also be unseated to permit continued quick service activity to be realized upon the subsequent effecting of a service application of the brakes as previously described.

Upon release of the brakes following an emergency application thereof, the service or triple valve portion 14 will respond to a slight preponderance of such as a fraction of a pound in brake pipe pressure in chamber 38 over auxiliary reservoir pressure in chamber 15 to cause the auxiliary slide valve 18 to move relative to the main slide valve 13 to its lap position for closing off the service port 49 in valve 13 to the slide valve chamber 15, thereby disconnecting the auxiliary reservoir from the brake cylinder via said chamber 15, said service port 49, and the brake cylinder passageway 28 which yet remains connected to said service port. Subsequently, upon establishment of a greater degree of preponderance, such as several pounds, in brake pipe pressure in chamber 38 over auxiliary reservoir pressure in chamber 15, diaphragm piston 36 will actuate stem 37 to move slide valve 13 and auxiliary slide valve 18 to assume their release positions in which they are shown in the drawing for release of fluid under pressure from the brake cylinder pressure chamber 22 in the brake cylinder device 2 in the same manner as described above in connection with release of brakes in a service application, bearing in mind that during a service application the service or triple valve portion will be in its lap position, whereas during an emergency application of the brakes, said service or triple valve portion 14 remains in its service application position in which the brake cylinder is connected to the auxiliary reservoir by way of the brake cylinder passageway 28, and main slide valve service port 49 uncovered to the slide valve chamber 15 by virtue of the position of the auxiliary slide valve 18 relative to main slide valve 13. Such application position of the service or triple valve portion 14 is maintained during an emergency application of the brakes by virtue of the preponderant effect of auxiliary reservoir pressure in the slide valve chamber 15 at one side of the diaphragm piston 36 over the atmospheric brake pipe pressure in chamber 38 at the opposite side of said diaphragm piston. It will also be appreciated in view of previous description in connection with initial charging of the equipment, that upon return of the slide valves 13 and 18 to their release position in which they are shown in the drawing responsive to establishment of the necessary degree of preponderance in brake pipe pressure in chamber 38 over auxiliary reservoir pressure in slide valve chamber 15, following either a service or an emergency application of the brakes, recharging of the auxiliary reservoir 3 or/and the emergency reservoir 4 for make-up of any pressure deficiency therein created as a result of supply to the brake cylinder device 2 will occur by way of the charging ports 12, 17 and 19 in slide valves 13 and 18, the slide valve chamber 15 etc.

Such release of fluid under pressure from the brake cylinder pressure chamber 22 at one side of the piston 21 in the brake cylinder device 2 will permit the return spring 23 to move said piston in the direction of said pressure chamber 22 to relieve the force applied to the brake rigging and thereby release the application of brakes on the car.

*Description of accelerated release control portion of the brake apparatus*

According to a feature of the invention, the brake controlling valve device 5 comprises an accelerated release selector valve portion 115 for controlling communication selectively between the input chamber 116 to an accelerated release control check valve 117 and either the emergency reservoir 4 or the brake cylinder device 2 and the auxiliary reservoir 3 by way of a passageway 118, according to whether a service application or an emergency application of the brakes, respectively, has been effected. The accelerated release selector valve portion 115 comprises a piston valve 119 slidably mounted in a bore 120 and exposed at one end to a chamber 121 which is constantly open to the quick action chamber 81 by way of passageway 80, and at its opposite end to a non-pressure chamber 122 which is constantly open to the atmosphere by way of a port 123. The piston valve 119 is provided with a pair of axially spaced-apart grooves 124 and 125 formed in its outer periphery which cooperate with the wall of bore 120 to control selective communication of the passageway 118 with either a branch of brake cylinder passageway 28 or a branch of the emergency reservoir passageway 20. The piston valve 119 is urged in the direction of the pressure chamber 121 to an accelerated emergency release position in which it is shown in the drawing, defined by engagement of the uppermost end of said piston valve with a casing shoulder 126, by a compression spring 127 disposed in a chamber 128, as well as by any pressure of fluid which may exist in said chamber, through the medium of a diaphragm piston 129 and a stem 130 attached to said piston valve. The diaphragm piston 129 is subject opposingly to pressure of fluid in the non-pressure chamber 122 at its one side and to pressure of fluid and force of the spring 127 at its opposite side. The chamber 128 is connected to a branch of the exhaust passageway and pipe 30, thence to the port 31 in the brake cylinder retainer device 32, the selector cock 34 of which is normally positioned to connect said passageway and pipe 30 to the atmosphere by way of the port 35, so that normally the chamber 128 in the accelerated release selector valve portion 115 will be at atmospheric pressure. With chamber 128 in portion 115 at atmospheric pressure, when quick action chamber fluid at normal brake pipe pressure is supplied to the chamber 121, such pressure will be capable of moving the piston valve 119 against opposition of the spring 127 to an accelerated service release position defined by engagement of a member 131 of the diaphragm piston 129 with a casing shoulder 132 to cause the groove 125 in piston valve 119 to disestablish communication between passageway 28 and passageway 118 while causing the groove 124 to communicate said passageway 118 with the emergency reservoir passageway 20.

According to a feature of the invention, the pressure chamber 121 in the accelerated release selector valve portion 115 is in constantly open communication with the quick action chamber 81 and with the chamber 79 in the emergency application control portion 76 so that the pressure of fluid in chamber 121 will vary correspondingly with quick action chamber pressure, and the value of the compression spring 127 is such that, when chamber 128 is at atmospheric pressure by virtue of the direct vent position of the selector cock 34 in the brake cylinder retainer device 32 and the quick action chamber pressure as experienced in said chamber 121 is at values corresponding to brake pipe pressures existent during any degree of service application of the brakes, the pressure of fluid in chamber 121 will actuate and hold the piston valve 119 in its accelerated service release position, opposite to that in which it is shown in the drawing, against opposition of said spring 127 to maintain the accelerated release supply passageway 118 connected to the emergency reservoir passageway 20 by way of the groove 124 in said piston valve. When quick action chamber pressure in chamber 121 is subsequently reduced below some value, such as thirty-five pounds per square inch, a value which is assuredly below any brake pipe pressure existent during a service application of the brakes or, in other words, when quick action chamber pressure in chamber 121 is reduced to a value which corresponds to a brake pipe pressure existent only during an emergency application of the brakes, then the spring 127 will cause the piston valve 119 to assume its accelerated emergency release position in which it is shown in the drawing, for connecting the accelerated release supply passageway 118 to the brake cylinder passageway 28 via groove 125. If, however, the selector cock 34 in the retainer device 32 is set to retain a certain brake cylinder pressure during release of fluid under pressure from the brake cylinder device 2 by way of exhaust passageway 30 and the service or triple valve portion 14, as by movement of said cock 34 to a position for disconnecting said passageway 30 directly to the atmosphere and connecting it to the atmosphere instead by way of port 31, reoriented port 33 in cock 34, a passageway 133, a spring-loaded check valve assemblage 134 which will pass fluid at pressures only above a certain value such as ten or twenty pounds per square inch, and a vent port 135; then, when chamber 128 is pressurized via passageway 30 at retainer valve setting, piston valve 119 cannot be moved to its accelerated service release position by quick action chamber pressure in chamber 121, due to the adidtional opposition to such movement afforded by pressure of fluid in chamber 128 acting on the piston valve 119 through the medium of the diaphragm piston 129 and the stem 130. If, during the release of fluid under pressure from the chamber 22 in the brake cylinder device 2 by way of the service or triple valve portion 14 and the exhaust passageway 30 as previously described, the chamber 128 becomes pressurized, by virtue of position of retainer valve device 32, while piston valve 119 is in its accelerated service release position opposite to that in which it is shown in the drawing, then pressure of fluid thus built-up in chamber 128 will, in assist to spring 127, act on the diaphragm piston 129 to return the piston valve 119 to its accelerated emergency release position in which it is shown in the drawing, and prevent its return to accelerated service release position until complete release of fluid under pressure from the chamber 128 with return of the selector cock 34 in the retainer valve device 32 to its non-retaining position in which it is shown in the drawing for complete release of fluid under pressure from the passageway 30 to the atmosphere.

In the emergency application control portion 76, a portion of the slide valve stem 83 extends slidably through a bore 136 for abutting engagement with the accelerated release control check valve 117 which is urged towards its seated position by a compression spring 137; the end of the stem 83 in proximity to valve 117 being reduced in cross-section to provide an annular passageway 138 within the bore 136 and in encirclement of the stem to accommodate flow of fluid under pressure from the chamber 116 to the brake pipe passageway 9 by way of a passageway 139 open to said passageway 138, and a spring-loaded, back-flow-preventing check valve 140 having a light bias spring 141 which requires an unseating differential in pressures across the check valve 140 of only several pounds per square inch.

*Accelerated release operation following a service application of the brakes*

According to the invention, during the previously-described initial charging of the equipment responsively to pressurization of the brake pipe 1, fluid under pressure from the brake pipe 1 will flow by way of the brake pipe passageway 6, the strainer chamber 7, the brake pipe passageway 9, and the choke 82 into the quick action chamber 81, thence, by way of the passageway 80, such fluid under pressure will flow to the chambers 79 and 121 in the emergency application control portion 76 and accelerated release selector valve portion 115, respectively, to charge these chambers to normal, full-charge, brake pipe pressure of such as the seventy pounds per square inch as herein previously chosen for example. During such charging of the quick action chamber 81, the brake pipe pressure in chamber 75 in the emergency application control portion 76, due to the restriction imposed by the choke 82 to charging of said quick action chamber with fluid under pressure from the brake pipe, will sufficiently preponderate over the quick action chamber pressure in chamber 79 in said portion 76 to cause the diaphragm piston 77 to unseat the accelerated release control check valve 117 through the medium of the slide valve stem 83 against opposition of the compression spring 137 and to maintain such check valve 117 unseated against action of said spring substantially until quick action chamber pressure equalizes via choke 82 with brake pipe pressure subsequent to attainment of its normal full-charge value. Such unseating of the check valve 117 during initial charging of the quick action chamber 81 as described above will not result in flow of fluid under pressure from chamber 116 to the brake pipe passageway 9 via the unseated check valve 117 however, since, at time of initial unseating of valve 117 the chamber 116 will be connected to the atmosphere by way of the passageway 118, groove 125 in the piston valve 119 of the accelerated release selector valve portion 115, the brake cylinder passageway 28, the groove 29 in the main slide valve 13 in the service or triple valve portion 14 which will be in its release position in which it is shown in the drawing, and the exhaust passageway 30; and subsequently, when chamber 116 becomes connected to the emergency reservoir 4 by quick-action-chamber-pressure-responsive movement of the piston valve 119 in the accelerated release selector valve portion 115, the pressure of fluid in the emergency reservoir will be less than that in the brake pipe pressure in passageway 9 and therefore incapable of flow thereto.

During such charging of the quick action chamber 81 from the brake pipe via passageway 9 and the choke 82, should the quick action chamber 81 become charged to a pressure above normal brake pipe pressure as a result of charging of the brake pipe to such as main reservoir pressure on the locomotive, such overcharge of the quick action chamber 81 will be rapidly dissipated to the brake pipe 1 upon subsequent return of brake pipe pressure to its normal full-charge value by way of the choke 82 and brake pipe passageway 9 as well as by way of the passageway 80, the chamber 79 in the emergency application control portion 76, a passageway 142, a spring-biased, spill-over check valve 143, the emergency reservoir passageway 20, the registering ports 19 and 17 in the slide valves 13 and 18 in the service or triple valve portion 14 which will be in its release position in which it is shown in the drawing, the slide valve chamber 15 in said portion 14, the brake pipe passageway 11, the charging choke 10, the brake pipe passageway 9, strainer chamber 7 and the brake pipe passageway 6 connected to the brake pipe 1.

Subsequent to initial charging of the equipment, and during the initiation of a service application of the brakes as previously described responsively to reduction in brake pipe pressure at a service rate up to the maximum degree of such as twenty pounds per square inch below the normal brake pipe pressure of such as seventy pounds per square inch, the diaphragm piston 77 in the emergency application control portion 76 will respond initially to such service reduction in brake pipe pressure as experienced in its chamber 75 relative to quick action chamber pressure in its chamber 79 to move the slide valve 84 to its position defined by engagement of the cage and return spring assemblage 78 with the casing shoulder 111 for connecting the chamber 79 to the exhaust passageway 114 by way of the port 112 in said slide valve 84 and the choke 113 to permit quick action chamber pressure to release to the atmosphere for reduction in pressure thereof corresponding to the reduction in brake pipe pressure at the service rate. During such reduction in quick action chamber pressure corresponding to reduction in brake pipe pressure during the effecting of a service application of the brakes, the quick action chamber pressure as experienced in the chamber 121 in the accelerated release selector valve portion 115 will be sufficient to maintain the piston valve 119 disposed in its accelerated service release position against opposition of the spring 127 to maintain the accelerated release supply passageway 118 connected to the emergency reservoir passageway 20; it being appreciated that during such service reduction in brake pipe pressure, the service or triple valve portion 14 will respond to the reduction in brake pipe pressure as previously described to initiate quick service activity, to effect supply of fluid under pressure from the auxiliary reservoir to brake cylinder device 2, and to subsequently assume its lap position for holding such pressure in the brake cylinder device upon termination of such service reduction in brake pipe pressure for effecting a service application of the brakes. Finally, immediately upon completion of reduction in brake pipe pressure, the quick action chamber pressure as experienced in the chamber 79 in the emergency application control portion 76 will be momentarily reduced, via port 112 in slide valve 84, below brake pipe pressure existent in chamber 75 sufficiently to cause the diaphragm piston 77 to move the slide valve 84 to a lap position in which it is shown in the drawing defined by engagement of the lowermost end of the slide valve stem 83 with the spring-loaded check valve 117. In such lap position of the slide valve 84 the port 112 therein will be out of registry with the choke 113 and thereby with the exhaust passageway 114 to prevent further reduction in quick action chamber pressure which will subsequently equalize with that in brake pipe by way of the passageway 80, choke 82, and the brake pipe passageway 9.

Subsequently, upon initiation of restoration in the brake pipe pressure following a service application of the brakes, such initial increase in brake pipe pressure will be experienced in the brake pipe pressure chamber 75 in the emergency application control portion 76 of the brake controlling valve device 5 on the first car or cars of the train, and when such brake pipe pressure in chamber 75 preponderates over quick action chamber pressure in chamber 79 of said portion 76 to a slight extent of such as seven-tenths of a pound per square inch, the diaphragm piston 77 will respond to unseat the accelerated release control check valve 117 through the medium of the slide valve stem 83 and permit fluid under pressure to flow from the emergency reservoir 4 locally into the brake pipe 1 for rapid equalization of pressures therebetween, by flow of fluid under pressure by way of the emergency reservoir passageway 20, the groove 124 in piston valve 119 in the accelerated release selector valve portion 115, the accelerated release supply passageway 118, the chamber 116 and the unseated accelerated release control check valve 117 in the emergency application control portion 76, the annular passageway 138 also therein, the passageway 139, the lightly-biased antiback-flow check valve 140, the brake pipe passageway 9, the strainer chamber 7, and the brake pipe passageway 6.

Immediately prior to the admission of fluid under pressure from the emergency reservoir 4 locally to the brake pipe 1 on a particular car by way of the accelerated release selector valve portion 115 and the emergency application control portion 76 as above described, the emergency reservoir pressure as bottled up by the service or triple valve portion 14 in its lap position will be at normal full charge brake pipe pressure of such as seventy pounds per square inch; pressure of fluid in the brake pipe 1 will be at a pressure corresponding to that resultant from the effecting of a service reduction in the brake pipe pressure for realization of the service application of the brakes, but no less than such as fifty pounds per square inch which corresponds to a full service reduction in brake pipe pressure below a normal full charge brake pipe pressure of seventy pounds per square inch; and pressure of fluid in the auxiliary reservoir 3 will be substantially equal to that in the brake cylinder pressure chamber 22 in the brake cylinder device 2 by virtue of previous equalization therewith during the effecting of the service application of the brakes, and such auxiliary reservoir and brake cylinder pressure in turn will be only slightly less than brake pipe pressure by the extent necessary to have caused the diaphragm piston 36 in the service or triple valve portion 14 to actuate the auxiliary slide valve 18 to its position for lapping off the service port 49 in the main slide valve 13 to the slide valve chamber 15 open to the auxiliary reservoir, as will be appreciated from previous description. Thus, for example, during the existence of a full service application of the brakes, pressure of fluid in the emergency reservoir 4 may be at such as seventy pounds per square inch, pressure of fluid in the brake pipe 1 may be at such as fifty pounds per square inch, and pressure of fluid in the brake cylinder pressure chamber 22 in the brake cylinder device 2 and in the auxiliary reservoir 3 will be at such as fifty pounds per square inch, less the necessary slight preponderance in brake pipe pressure required to move the service or triple valve portion 14 to its lap position. Where, as in the usual fluid pressure railway brake apparatus employed in the United States, the volume of the emergency reservoir 4 in the brake apparatus on any particular car is about three and one-half times the volume of the brake pipe on such car, with such pressure relationships existing as set forth above, then, upon equalization of pressure of fluid in the emergency reservoir 4 with that in the brake pipe 1 on the particular car by way of the accelerated release selector valve portion 115 and the emergency application control portion 76 of the respective brake controlling valve device 5 responsive to initiation of brake pipe pressure restoration following a service application of the brakes as previously described, pressure of fluid in the emergency reservoir 4 will equalize into the brake pipe 1 on such car at about sixty-four pounds per square inch. Such brake pipe pressure of sixty-four pounds per square inch as experienced in the brake pipe pressure chamber 38 in the service or triple valve portion 14 of such brake controlling valve device 5, being some fourteen pounds per square inch greater than auxiliary reservoir pressure in the slide valve chamber 15 of said portion 14, will be more than ample to cause said service or triple valve portion to assume its release position in which it is shown in the drawing for releasing fluid under pressure from the brake cylinder pressure chamber 22 in the respective brake cylinder device 2 as previously described herein for releasing the service application of brakes on such car. Immediately upon the service or triple valve portion 14 thus assuming its release position in which it is shown in the drawing, the pressure of fluid in the emergency reservoir 4, being higher than the auxiliary reservoir pressure, will tend to equalize with auxiliary reservoir pressure by way of the emergency reservoir passageway and pipe 20, the registered ports 19 and 17 in the slide valves 13 and 18 in said service or triple valve portion 14, the slide valve chamber 15 therein, and the passageway and pipe 16.

The equalization pressure resultant from such flow from the emergency reservoir 4 to the auxiliary reservoir 3 as experienced in chamber 15 in the triple valve portion 14, however, will not be as high as the brake pipe pressure in chamber 38 existent at that time, due to the ratio of the volumes of the two reservoirs, a ratio usually of approximately one and four-tenths to one in the direct release type brake equipments employed in the United States. For example, where such ratio of emergency reservoir volume to auxiliary reservoir volume exists and the brake pipe and emergency reservoir pressures following a full service application of the brakes are such as sixty-four and sixty-six pounds per square inch, respectively, immediately after "equalization" of the emergency reservoir with the brake pipe by way of the emergency application control portion 76 and the spring-biased check valve 140 as previously described, then the emergency reservoir 4 might equalize with the auxiliary reservoir 3 at such as fifty-nine pounds per square inch by way of the slide valve chamber 15 in the triple valve portion 14 when it assumes its service position, and such resultant pressure of fifty-nine pounds per square inch in slide valve chamber 15 is incapable of causing said triple valve portion to leave its service position against opposition of the sixty-four pounds per square inch of brake pipe pressure in chamber 38. Similar circumstances prevail during any degree of service application of the brakes.

Following such equalization of emergency reservoir pressure with that in the auxiliary reservoir 3, or/and coincident therewith, pressure of fluid in the brake pipe 1 will flow via brake pipe passageway 9, charging choke 10, charging passageway 11, port 12 in slide valve 14 to the slide valve chamber 15 in triple valve portion 14, thence, by way of the passageway and pipe 16, to the auxiliary reservoir 3 to recharge same, and, via port 17 in the slide valve 18, port 19 in the slide valve 13, and the passage and pipe 20, to the emergency reservoir 4 for its recharge, as brake pipe pressure is increased to its normal full-charge value of such as seventy pounds per square inch by way of the engineer's brake valve on the locomotive.

At the same time, such substantially immediate increase in pressurization of the brake pipe 1 on the particular car, resultant from supply of fluid under pressure thereto from the emergency reservoir 4 via the emergency application control portion 76 in response to initiation in brake pipe pressure restoration following a service application of the brakes as described, is propagated via the brake pipe 1 to the brake controlling valve device 5 on the next car of the train to cause operation of its emergency application control portion 76 to "equalize" its emergency reservoir 4 locally with the brake pipe 1 on such car and to thereby cause the respective triple valve portion 14 to assume its release position for release of the service application of the brakes on such car, and so on serially from car to car back through the train.

By virtue of the accelerated release feature of applicants' direct release type brake control apparatus as disclosed herein, it has been demonstrated on a test rack composed of a number of brake apparatuses embodying said accelerated release feature, arranged to duplicate operation in a train, that the release transmission time on a train similarly equipped can be greatly reduced below that on trains of equal length employing conventional brake apparatuses not embodying such accelerated release feature. For example, rack tests indicate that, during brake release following a service application of the brakes, the release transmission time on a train of one hundred fifty cars each equipped with a brake apparatus embodying applicants' accelerated release feature, will be less than one-fifth of that required for a train of equivalent length equipped exclusively with conventional direct-release type brake apparatuses. Moreover, rack tests indicate that by interposing cars employing applicants' accelerated release equipment at certain intervals in a train between cars equipped with such as the well-known AB brake valves, the resultant local build-up in brake pipe pressure at such intervals can be propagated through the brake pipe on the AB equipped cars to hasten the brake release propagation time of such train.

If, at the time that the emergency application control portion 76 in the respective brake controlling valve device 5 unseats the accelerated release control check valve 117 responsively to restoration of brake pipe pressure following a service application of the brakes, the piston valve 119 in the accelerated release selector valve portion 115 is in its uppermost position in which it is shown in the drawing as a result of pressurization of chamber 128 by retainer valve retention during "cycling" operation of the brakes on the train, for example, then, since chamber 116 at the input side of the unseated accelerated release control check valve 117 is disconnected from the emergency reservoir 4 and connected instead, by the groove 125 in said piston valve 119, to the brake cylinder pressure chamber 22 which at this time will be slightly less than brake pipe pressure, according to a feature of the invention, there will be no flow into the brake pipe by way of the unseated check valve 117 for acceleration of brake release, and the emergency reservoir pressure will not be depleted, but rather will be kept in reserve for emergency use, if it becomes necessary, for example, due to depletion of fluid under pressure from the auxiliary reservoir with too frequent alterations in application and release of the brakes during such "cycling."

At each brake controlling valve device 5 following restoration of brake pipe pressure to its normal full-charge value of such as seventy pounds per square inch subsequent to accelerated release of a service application of the brakes as described in the preceding paragraphs, quick action chamber pressure as experienced in chamber 79 in the emergency application control portion 76 will equalize with brake pipe pressure in the chamber 75 of said portion 76, by way of the brake pipe passageway 9, the choke 82, and the passageway 80, and such equalization of pressures on opposite sides of the diaphragm piston 77 will permit the spring 137 to seat the accelerated release control check valve 117 and return the slide valve stem 83, the slide valve 84 and said diaphragm piston to their respective positions in which they are shown in the drawing.

*Accelerated release operation following emergency application of the brakes*

During the effecting of an emergency application of the brakes as previously described herein, as brake pipe pressure is suddenly reduced to that of the atmosphere the quick action chamber pressure is correspondingly reduced by flow of fluid under pressure from the chamber 79 in the emergency application control portion 76 by way of the port 85 in the slide valve 84 in its emergency application position, as will be appreciated from such previous description, the passageway 86, the blow-down timing choke 105 associated with the emergency vent valve portion 89, passageway 106 and port 108 of said portion 89, and the large-capacity vent passageway 96.

When the quick action chamber pressure as experienced in the chamber 121 in the accelerated release selector valve portion 115 is thus reduced below such as thirty-five pounds per square inch, the spring 127 in said portion 115 will actuate the piston valve 119 from its lowermost or accelerated service release position, opposite to that in which it is shown in the drawing and which it occupies during existence of a service application of brakes, to its accelerated emergency release position, in which it is shown and which is defined by engagement of the uppermost end of said piston valve 119 with the casing shoulder 126, to connect the brake cylinder passageway 28 to the chamber 116 at the input side of the accelerated release control check valve 117, by way of the passageway 118 and the groove 125 in said piston valve 119.

While the emergency application of the brakes remains in effect, the quick action chamber will remain at atmospheric pressure along with pressure of fluid in the brake pipe, and such quick action chamber pressure as experienced in the chamber 121 in the accelerated release selector valve portion 115 will permit the piston valve 119 therein to remain in its accelerated emergency release position, while the equalization between brake pipe pressure in chamber 75 and quick action chamber pressure in chamber 79 in the emergency application control portion 76 at opposite sides of the diaphragm piston 77 permits the cage and spring assemblage 78, previously held in compression, to move the slide valve 84 through the medium of the stem 83 to its breather position in which said chamber 79 is connected to the atmosphere by way of the slide valve port 112, the choke 113, the passageway 114 and the large capacity vent passageway 96. Also during the existence of such emergency application of the brakes, from the previous description in connection with the effecting of such emergency application, it will be appreciated that the pressure of fluid in the auxiliary reservoir 3 and in the emergency reservoir 4 will have equalized with that in the brake cylinder pressure chamber 22 at such as sixty or sixty-one pounds per square inch, for example, while the brake pipe is at atmospheric pressure, and therefore, as a result of the continued preponderance of auxiliary reservoir pressure as experienced in the slide valve chamber 15 in the service or triple valve portion 14 over brake pipe pressure as experienced in the chamber 38 in said portion, such preponderance will maintain the service or triple valve portion in its application position in which said auxiliary reservoir 3 is maintained connected to the brake cylinder passageway 28 via said slide valve chamber 15 and the service port 49 in the main slide valve 13 of said triple valve portion. It will also be appreciated, that, during the existence of an emergency application of the brakes, the vent valve 99 in the emergency vent valve portion 89 will have returned to and will remain in its closed position in which it is shown in the drawing.

Upon initiation of brake pipe pressure restoration following an emergency application of the brakes by a supply of fluid under pressure to the brake pipe via the engineer's brake valve device on the locomotive, the brake pipe pressure as experienced in chamber 101 will cause the piston valve 102 in high pressure valve portion 93 to return and remain in the position in which it is shown in the drawing for disestablishing communication between the emergency reservoir passageway 20 and the brake cylinder passageway 28 via the groove 104, while, by virtue of the restriction presented by choke 82 to recharging of the quick action chamber 81 and the combined capacity of said chamber 81 with that in the chamber 79 in the emergency application control portion 76, the brake pipe pressure as experienced in chamber 75 in said portion 76 will quickly be made to preponderate over quick action chamber pressure 79 sufficiently to cause the diaphragm piston 77 to move the slide valve 84 to a position for blanking off the exhaust choke 113 to said chamber 79 and to cause stem 83 to unseat the accelerated release control check valve 117 against opposition of the spring 137 to permit substantial equalization flow of fluid under pressure to the brake pipe, from the brake cylinder pressure chamber 22 and the auxiliary reservoir 3. Such equalization flow to the brake pipe for pressurizing same will occur by way of the brake pipe passageway 9, the lightly spring-biased anti-back-flow check valve 140, the passageway 139, the annular passageway 138 in the emergency application control portion 76, the unseated accelerated release control check valve 117 and the chamber 116 also in said portion 76, the passageway 118, the groove 125 in the piston valve 119 in the accelerated release selector valve portion 115, and the brake cylinder passageway 28 which is connected at this time to the auxiliary reservoir 3 by way of the service port 49 in the slide valve 13 in the service or triple valve portion 14, slide valve chamber 15 therein, and the passageway and pipe 16, and which is at the same time connected to brake cylinder pressure chamber 22 by way of the unseated check valve 27 and the chamber 25 in the brake cylinder inshot and quick service limiting portion 26, and the passageway and pipe 24.

Such equalization in pressures between the brake pipe 1, the brake cylinder pressure chamber 22 and the auxiliary reservoir 3 will result in a rapid increase in brake pipe pressure on the first car in the train from atmospheric pressure to such as forty-five pounds per square inch, while the pressure of fluid in the auxiliary reservoir and in brake cylinder pressure chamber 22 will reduce to such as forty-seven pounds per square inch, and the emergency reservoir at this time remains at a pressure of such as sixty pounds per square inch. Such local pressurization of the brake pipe on the first car of the train by equalization of the auxiliary reservoir 3 and the brake cylinder pressure chambers 22 into the brake pipe 1 will cause sufficient pressurization of the brake pipe pressure chamber 75 in the emergency application control portion 76 in the corresponding brake controlling valve device or devices 5 on the succeeding car or cars in the train to actuate the respective accelerated release control check valve or valves 117 as the case may be to cause a similar local pressure equalization of the respective brake cylinder pressure chambers and auxiliary reservoirs locally with that in the brake pipe 1 for rapid pressurization of same to a considerable degree, and so on serially back through the train.

Meanwhile, in the brake controlling valve device 5 on each car in which such pressure equalization of the auxiliary reservoir and brake cylinder with the brake pipe is occurring, the quick action chamber pressure will be built up from the brake pipe 1 by way of brake pipe passageway 9 and the choke 82, which choke maintains sufficient differential between brake pipe pressure as experienced in chambers 75 in the emergency application control portion 76 and the quick action chamber pressure as experienced in the chamber 79 in said portion 76 to hold the accelerated release control check valve 117 unseated. Following such pressure equalization of the brake cylinder pressure chamber 22 and the auxiliary reservoir 3 with the brake pipe 1, the quick action chamber pressure will be increased as above sufficiently to move the piston valve 119 in the accelerated release selector valve portion 115 downwardly as viewed in the drawing to its accelerated service release position to connect the emergency reservoir at such as sixty pounds per square inch with the brake pipe 1 at such as forty-five pounds per square inch, or higher as a result of flow of fluid under pressure thereto by the engineer's brake valve on the locomotive, by way of the emergency reservoir pipe and passageway 20, the groove 124 in said piston valve 119, the passageway 118, the chamber 116, the unseated accelerated release control check valve 117, the annular passageway 138, the passageway 139, the lightly spring-biased anti-back-flow check valve 140, the brake pipe passageway 9, the strainer chamber 7 and the brake pipe passageway 6.

As a result of such equalization of the emergency reservoir 4 into the brake pipe 1, pressure of fluid in the brake pipe will suddenly be increased from such as forty-five or so pounds per square inch to a value in excess of fifty-eight pounds per square inch, and such brake pipe pressure in excess of fifty-eight pounds per square inch as thus suddenly experienced in the brake pipe pressure chamber 38 in the service or triple valve portion 14 will sufficiently preponderate over the auxiliary reservoir pressure at forty-seven pounds per square inch in the slide valve chamber 15 to cause the service or triple valve portion 14 to assume its release position in which it is shown in the drawing for effecting a release of fluid under pressure from the brake cylinder pressure chamber 22 in the brake cylinder device 2 as previously described herein.

Upon movement of the service or triple valve portion 14 to its release position in which it is shown in the drawing as above mentioned, the emergency reservoir 4 at such as fifty-eight pounds per square inch will tend to equalize with the auxiliary reservoir at such as forty-seven pounds per square inch by way of the passageway and pipe 20 and the ports 19 and 17 in the slide valves 13 and 18 in said triple valve portion 14, the slide valve chamber 15, and the passageway and pipe 16, but such equalization, even if realized, irrespective of the fact that such ports 17 and 19 are of somewhat limited capacity, could result only in an equalization pressure in said chamber 15 of such as fifty-three pounds per square inch, a pressure incapable of overcoming opposition of the brake pipe pressure in chamber 38 and causing the service valve portion 14 to assume its quick service position.

Subsequent to pressure equalization of the auxiliary reservoir 3 and the brake cylinder pressure chamber 22 on a particular car of a train with the brake pipe 1 on such car, and subsequently, of the emergency reservoir 4 with said brake pipe 1, the pressure of fluid in the brake pipe will be increased via the engineer's brake valve on the locomotive to its normal full charge value of such as seventy pounds per square inch for recharging the auxiliary and emergency reservoirs 3 and 4 to the same value by way of the service or triple valve portion 14 of the respective brake controlling valve device 5 as previously described. Pressure of fluid in the quick action chamber 81 also attains such normal full-charge value by virtue of charging flow from brake pipe 1 by way of passageway 9 and the coke 82, and when, during its build-up, the quick action chamber pressure as experienced in the chamber 79 in the emergency application portion 76 increases to within a slight degree less than normal brake pipe pressure existent in the chamber 75, the spring 137 acting on the check valve 117 will reseat same and cause actuation of the slide valve 84 and piston diaphragm 77 to the respective positions in which they are shown in the drawing, in preparation for subsequent activity upon reapplication of brakes.

*Summary*

From the foregoing description of applicants' improved direct-release type brake apparatus for use on railway cars, it will be apparent that, according to novel features of such apparatus, release of the brakes following both a service application and an emergency application thereof is greatly accelerated. In connection with accelerated release following a service application of the brakes, such features is realized to great advantage on long trains where such accelerated release of the brakes, in reducing the release propagation time through the train, enables brakes on the train to be released while the train is still in motion, without danger of break-in-two between cars somewhere in the train, thereby greatly facilitating expeditious transportation of such train.

Having now described the invention, what we claim as new and desire to secure by Letters Patent, is:

1. In a fluid pressure brake apparatus, in combination, a normally charged brake pipe; a brake cylinder device; a normally charged auxiliary reservoir; a normally charged supplemental reservoir; service valve means controlling supply and release of auxiliary reservoir fluid under pressure to and from said brake cylinder device responsively to reduction and restoration of brake pipe pressure; an accelerated release supply chamber; an accelerated release control valve controlling communication between said accelerated release supply chamber and said brake pipe; a selector valve operable to selectively establish communication between said accelerated release supply chamber and said supplemental reservoir or between said accelerated release supply chamber and said brake cylinder device and said auxiliary reservoir; and means controlled by brake pipe pressure and controlling operation of said accelerated release control valve and of said selector valve to effect supply of fluid under pressure to said brake pipe from said supplemental reservoir upon initiation of brake pipe pressure restoration following a service reduction in brake pipe pressure and to effect supply of fluid under pressure to said brake pipe from said brake cylinder device and said auxiliary reservoir upon initiation of brake pipe pressure restoration following an emergency reduction in brake pipe pressure.

2. In a fluid pressure brake apparatus, a normally charged brake pipe, a brake cylinder device, a normally charged auxiliary reservoir, a normally charged emergency reservoir, service valve means operative upon reduction in brake pipe pressure relative to auxiliary reservoir pressure to establish a service supply communication between said auxiliary reservoir and said brake cylinder device, operative upon substantial equalization of auxiliary reservoir pressure with brake pipe pressure to close said service supply communication, and operative upon subsequent preponderance in brake pipe pressure over auxiliary reservoir pressure to establish a brake cylinder exhaust communication for venting fluid under pressure from said brake cylinder device, emergency control valve means operative upon reduction in brake pipe pressure at an emergency rate to establish an emergency supply communication between said emergency reservoir and said brake cylinder device and operative to close said emergency supply communication upon subsequent initiation of brake pipe pressure restoration, one-way flow valve means having an inlet for admission of fluid under pressure and an outlet open to said brake pipe, an accelerated release supply passageway, accelerated release selector means automatically operative to connect said accelerated release supply passageway selectively to said service supply communication or to said emergency reservoir according to whether or not, respectively, an emergency reduction in brake pipe pressure has been effected, and accelerated release control means operative to connect said accelerated release supply passageway to the inlet of said one-way-flow valve means upon initiation of brake pipe pressure restoration following an application of the brakes.

3. The combination as set forth in claim 2, further including retainer valve means selectively positionable to permit either complete or partial release of fluid under pressure from said brake cylinder device via said exhaust communication when established by said brake controlling means following a brake application, and means controlled by pressure of fluid in said exhaust communication to prevent flow of fluid under pressure from said accelerated release supply passageway to said brake pipe via said one-way-flow valve means when brake cylinder pressure is being retained by said retainer valve means.

4. In a fluid pressure brake apparatus, in combination, a brake pipe; a brake cylinder device; an auxiliary reservoir; an emergency reservoir; triple valve means responsive to preponderance in brake pipe pressure over auxiliary reservoir pressure and vice versa to selectively open said brake cylinder device to the atmosphere, and to said auxiliary reservoir, respectively, and to restrictedly open and to close, respectively, the auxiliary and emergency reservoirs to said brake pipe; high pressure valve means responsive to preponderance in pressure of fluid in a high pressure valve control chamber over brake pipe pressure and vice versa to open and close, respectively, said brake cylinder device to said emergency reservoir;

vent valve means operable responsively to pressure of fluid in a vent valve control chamber above and below a certain value to open and close, respectively, said brake pipe locally to the atmosphere; a restricted blowdown communication constantly connecting the high pressure and vent valve control chambers to the atmosphere; anti-back-flow check valve means having an inlet to receive fluid under pressure and having an outlet constantly open to said brake pipe; a quick action chamber in constantly open restricted communication with said brake pipe; an accelerated release supply passageway; control means responsive to reduction in brake pipe pressure at a service rate to effect a simultaneous corresponding reduction in quick action chamber pressure, responsive to reduction in brake pipe pressure at a rate greater than said service rate to prevent said simultaneous corresponding reduction in quick action chamber pressure and to connect said quick action chamber to the high pressure and vent valve control chambers for effecting operation of the high pressure and vent valve means, responsive to subsequent stabilization of brake pipe pressure following service and emergency reductions in such pressure to close said quick action chamber to the high pressure and vent valve control chambers, and responsive subsequently to initiation in brake pipe pressure restoration to open said accelerated release supply passageway to the inlet of said anti-back-flow check valve means; and accelerated release selector valve means responsive to quick action chamber pressures above and below a value corresponding to a brake pipe pressure existent only during an emergency application of the brakes, to selectively connect said accelerated release supply passageway to said emergency reservoir and to said brake cylinder device, respectively.

5. The combination as set forth in claim 4, further characterized in that said control means comprises an accelerated release control check valve biased toward a closed position; a slide valve having a breather port constantly open to said quick action chamber and adapted for registry with a restricted vent port to the atmosphere and having a high pressure and vent valve control port also constantly open to said quick action chamber and adapted for registry with a supply port open to the high pressure and vent valve control chambers; a caged spring assemblage; and a movable abutment subject opposingly to brake pipe and quick action chamber pressures operatively connected to a stem for actuating said slide valve and said accelerated release control check valve, said movable abutment being normally positioned while brake pipe and quick action chamber pressures are at a normal full-charge value to maintain the breather and control ports in said slide valve closed to the restricted vent and supply ports, respectively, and to maintain said accelerated release control check valve closed, said movable abutment being responsive to a reduction in brake pressure relative to quick action chamber pressure to actuate said slide valve to register said breather port with said restricted vent port for equalizing quick action chamber pressure with brake pipe pressure when same is reducing at a service rate and to further actuate, against opposition of said caged spring assemblage, said slide valve to close said restricted vent port and register said control port with said supply port when brake pipe pressure is reducing at an emergency rate, said movable abutment being responsive to subsequent equalization in brake pipe and quick action chamber pressures to permit said caged spring assemblage to actuate said slide valve to its position for registry of its breather port with said restricted vent port while blanking off its control port, said movable abutment being responsive to subsequent preponderance in brake pipe pressure over quick action chamber pressure to open said accelerated release control check valve while the breather and control ports in said slide valve remain blanked off to the vent and supply ports, respectively, and said movable abutment means being responsive to subsequent substantial equalization in quick action chamber pressure with brake pipe pressure to move to permit said accelerated release control check valve to reclose while the breather and control ports in said slide valve remain blanked off to the vent and supply ports, respectively.

6. In a fluid pressure brake apparatus, in combination, a normally charged brake pipe, a normally charged emergency reservoir, means defining an accelerated release communication for conveying fluid under pressure from said emergency reservoir to said brake pipe, an accelerated release control check valve biased toward a seated position for normally closing said accelerated release communication, a quick action chamber normally charged to the normal charge value of brake pipe pressure, normally closed breather control valve means controlling connection of said quick action chamber with the atmosphere, actuating stem means for actuating said breather control valve means and for engaging said accelerated release control check valve to unseat same, a movable abutment subject opposingly to brake pipe and quick action chamber pressures and operatively connected to said actuating stem means and responsive to a service rate of reduction in brake pipe pressure relative to quick action chamber pressure for opening said breather control valve means to effect reduction in quick action chamber pressure to substantially the same value as the reduced brake pipe pressure while said accelerated release control check valve remains seated, and responsive to a subsequent slight increase in brake pipe pressure above quick action chamber pressure to unseat said accelerated release control check valve for opening said accelerated release communication.

References Cited in the file of this patent

UNITED STATES PATENTS

| | | |
|---|---|---|
| 1,438,317 | Lewis | Dec. 12, 1922 |
| 1,585,774 | Farmer | May 25, 1926 |
| 1,842,519 | Farmer | Jan. 26, 1932 |
| 1,919,401 | Thomas | July 25, 1933 |
| 1,942,503 | Whitaker | Jan. 9, 1934 |